(12) United States Patent
Doering et al.

(10) Patent No.: US 7,572,204 B2
(45) Date of Patent: Aug. 11, 2009

(54) SYSTEM AND METHOD TO REDUCE STALL DURING DECELERATION FUEL SHUT OFF

(75) Inventors: Jeff Doering, Canton, MI (US); David Bidner, Livonia, MI (US); Shane Elwart, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 363 days.

(21) Appl. No.: 11/317,397

(22) Filed: Dec. 22, 2005

(65) Prior Publication Data

US 2007/0149358 A1  Jun. 28, 2007

(51) Int. Cl.
*B60W 10/06* (2006.01)
*B60W 10/18* (2006.01)

(52) U.S. Cl. .................................... 477/203; 477/183
(58) Field of Classification Search ................ 477/205, 477/207
See application file for complete search history.

(56) References Cited

U.S. PATENT DOCUMENTS

| | | | |
|---|---|---|---|
| 5,094,206 A | 3/1992 | Buslepp et al. | |
| 6,021,638 A * | 2/2000 | Hochmuth | 60/274 |
| 6,032,753 A | 3/2000 | Yamazaki et al. | |
| 6,334,835 B1 | 1/2002 | Tanaka et al. | |
| 6,560,960 B2 | 5/2003 | Nishimura et al. | |
| 2007/0095589 A1 * | 5/2007 | Tamai et al. | 180/197 |

* cited by examiner

*Primary Examiner*—Charles A Marmor
*Assistant Examiner*—Edwin A. Young
(74) *Attorney, Agent, or Firm*—Julia Voutyras; Alleman Hall McCoy Russell & Tuttle LLP

(57) ABSTRACT

A method of controlling fuel injection in an engine of a vehicle having an anti-lock braking system comprises under conditions of degraded operation of an anti-lock braking system, restricting deactivation of the fuel injection during deceleration vehicle operating conditions. According to another aspect, the method comprises under conditions where the anti-lock braking system is functioning, disabling fuel injection during at least some deceleration operations; and under conditions of degraded operation of the anti-lock braking system, restricting deactivation of the fuel injection during deceleration vehicle operating conditions. By considering the functioning of an ABS, it is possible to deactivate fuel injection during some deceleration operations during one condition to realize fuel economy gains and disable the deactivation of fuel injection at another condition to reduce engine stalls. Thus, the deceleration fuel shut off strategy may be used aggressively for improved fuel economy.

17 Claims, 6 Drawing Sheets

# US 7,572,204 B2

SYSTEM AND METHOD TO REDUCE STALL DURING DECELERATION FUEL SHUT OFF

FIELD

The present application relates generally to a system and method to improve drivability with deceleration fuel shut off, and more specifically to control cylinder activation and deactivation to reduce stall during deceleration fuel shut off.

BACKGROUND AND SUMMARY

In vehicles having internal combustion engines, it can be beneficial to discontinue fuel injection to all or some of the engine cylinders during certain operating conditions, such as during vehicle deceleration or braking. The greater the number of cylinder deactivated, or the longer cylinders are deactivated, the greater the fuel economy improvement that can be achieved.

The inventors herein, however, have some drivability issues of DFSO related to engine stalls. Specifically, a likelihood of engine stalls may increase when trying to re-enable deactivated cylinders depending on the functioning of an anti-lock braking system (ABS) on low μ coefficient surface such as ice. For example, if the ABS system is degraded thus causing drive wheels to lock-up (i.e., have an effective speed of zero) on such surfaces, this may increase the chance that an engine speed is substantially decreased or brought to zero thus increasing a chance of engine stalls.

One approach to address engine stalling during fuel-cut control is described in the U.S. Pat. No. 6,334,835. In the '835 reference, abrupt deceleration of a vehicle is detected based on a depression amount or depression speed of a brake pedal. If abrupt deceleration of the vehicle has been detected during fuel-cut control, a command is issued to make forcible restoration of control out of the fuel-cut control. Then a lock-up clutch is disconnected and fuel injection for an engine is resumed so as to restore a rotational speed of the engine and to prevent stalling.

However, the inventors herein have recognized several disadvantages of such an approach. For example, the abrupt deceleration may include the conditions where the resulting speed after the abrupt deceleration is not low for a stall to occur. Thus, the '835 approach may exclude the DFSO in the conditions where DFSO may be performed for improved fuel economy. In another example, the abrupt deceleration based on a depression amount or depression speed of a brake pedal may not detect conditions where a stall most likely occurs, such as when the wheels may become locked.

The above disadvantages may be overcome by a method for controlling fuel injection in an engine of a vehicle, the vehicle also including an anti-lock braking system. The method comprises restricting deactivation of the fuel injection under conditions of degraded operation of an anti-lock braking system during deceleration vehicle operating conditions.

In this way, a likelihood of engine stalling may be reduced in conditions where an anti-lock braking system may not be able to unlock the wheel on a slippery surface such as on ice or wet surfaces.

In another aspect, the above disadvantages may be overcome by a method of controlling fuel injection in an engine of a vehicle, the vehicle having an anti-lock braking system. The method comprises disabling fuel injection during at least some deceleration operations under conditions of functioning of the anti-lock braking system; and restricting deactivation of the fuel injection during deceleration vehicle operating conditions under conditions of degraded operation of an anti-lock braking system.

By considering the functioning of an ABS, it is possible to deactivate fuel injection during some deceleration operations during one condition to realize fuel economy gains and disable the deactivation of fuel injection at another condition to reduce engine stalls. Thus, the deceleration fuel shut off strategy may be used more aggressively for improved fuel economy.

In yet another aspect, the above disadvantages may be overcome by a method of controlling fuel injection in an engine of a vehicle. The method comprises deactivating a fuel injector of the engine during a deceleration condition of the vehicle; and reactivating the fuel injector when a rate of change of a powertrain shaft deceleration is greater than a threshold.

In this way, the threshold of powertrain shaft deceleration or jerk may be set as a function of the current gear or ratio of speeds. Further, the jerk threshold may be adjusted as a function of the ABS functionality. Furthermore, the jerk may be used independent of the state of the ABS system. Therefore, the method may allow even more aggressive use of DFSO.

DETAILED DESCRIPTION

Figure 1:
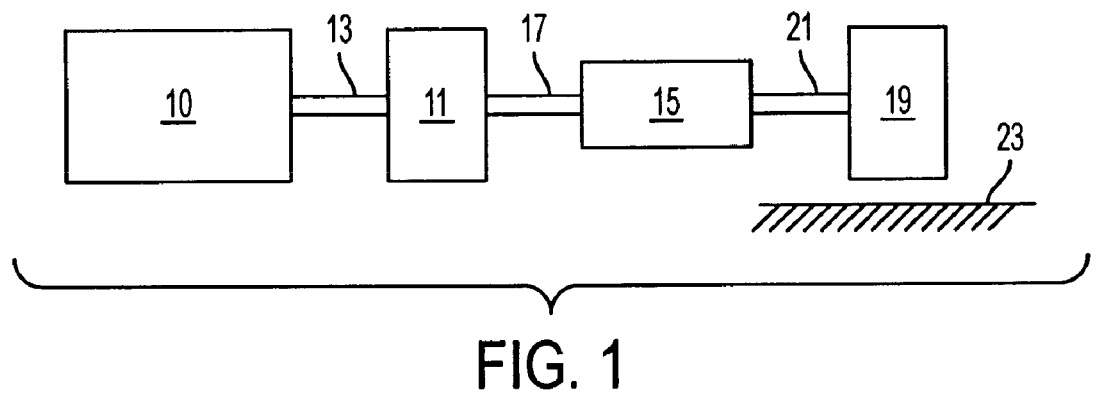
FIG. 1 is a block diagram of a vehicle illustrating various components related to the present application.
Figure 2:
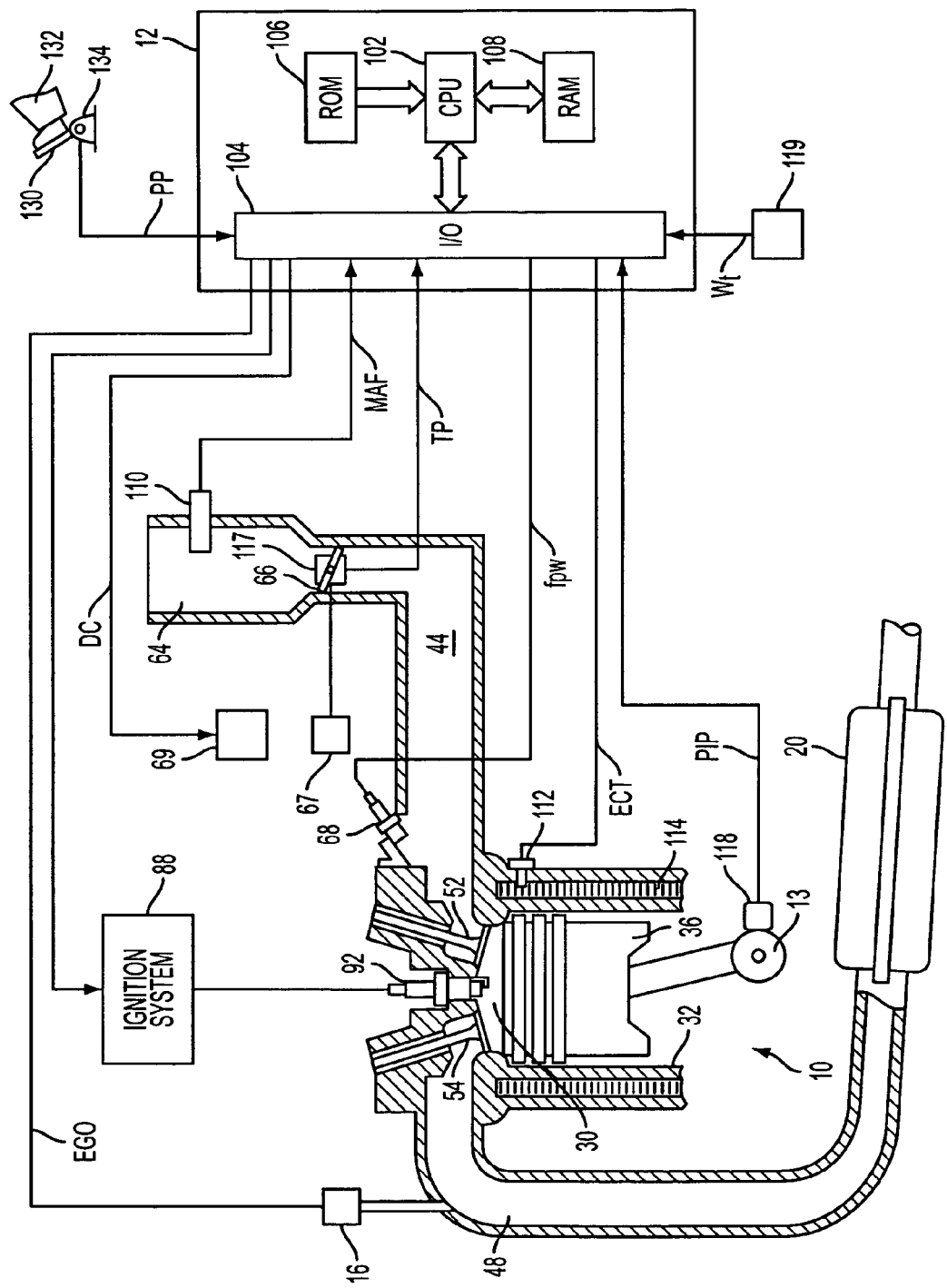
FIG. 2 is a schematic depiction of an exemplary embodiment of an engine.

Referring to FIG. 1, internal combustion engine 10, further described herein with particular reference to FIG. 2, is shown coupled to torque converter 11 via crankshaft 13. Torque converter 11 is also coupled to transmission 15 via turbine shaft 17. Torque converter 11 has a bypass clutch (not shown) which can be engaged, disengaged, or partially engaged. When the clutch is either disengaged or partially engaged, the torque converter is said to be in an unlocked state. Turbine shaft 17 is also known as transmission input shaft. Transmission 15 comprises an electronically controlled transmission with a plurality of selectable discrete gear ratios. Transmission 15 also comprises various other gears, such as, for example, a final drive ratio (not shown). Transmission 15 is also coupled to tire 19 via axle 21. Tire 19 interfaces the vehicle (not shown) to the road 23. Note that in one example embodiment, this powertrain is coupled in a passenger vehicle that travels on the road.

Internal combustion engine 10 comprising a plurality of cylinders, one cylinder of which is shown in FIG. 2, is controlled by electronic engine controller 12. Engine 10 includes combustion chamber 30 and cylinder walls 32 with piston 36 positioned therein and connected to crankshaft 13. Combustion chamber 30 communicates with intake manifold 44 and exhaust manifold 48 via respective intake valve 52 and exhaust valve 54. Exhaust gas oxygen sensor 16 is coupled to exhaust manifold 48 of engine 10 upstream of catalytic converter 20.

Intake manifold 44 communicates with throttle body 64 via throttle plate 66. Throttle plate 66 is controlled by electric motor 67, which receives a signal from ETC driver 69. ETC driver 69 receives control signal (DC) from controller 12. Intake manifold 44 is also shown having fuel injector 68 coupled thereto for delivering fuel in proportion to the pulse width of signal (fpw) from controller 12. Fuel is delivered to fuel injector 68 by a conventional fuel system (not shown) including a fuel tank, fuel pump, and fuel rail (not shown). In another embodiment, fuel injection 68 may be coupled to the cylinder head with a direct fuel injection.

Engine 10 further includes conventional distributorless ignition system 88 to provide ignition spark to combustion chamber 30 via spark plug 92 in response to controller 12. In the embodiment described herein, controller 12 is a conventional microcomputer including: microprocessor unit 102, input/output ports 104, electronic memory chip 106, which is an electronically programmable memory in this particular example, random access memory 108, and a conventional data bus.

Controller 12 receives various signals from sensors coupled to engine 10, in addition to those signals previously discussed, including: measurements of inducted mass air flow (MAF) from mass air flow sensor 110 coupled to throttle body 64; engine coolant temperature (ECT) from temperature sensor 112 coupled to cooling jacket 114; a measurement of throttle position (TP) from throttle position sensor 117 coupled to throttle plate 66; a measurement of turbine speed (Wt) from turbine speed sensor 119, where turbine speed measures the speed of shaft 17, and a profile ignition pickup signal (PIP) from Hall effect sensor 118 coupled to crankshaft 13 indicating an engine speed (N). Alternatively, turbine speed may be determined from vehicle speed and gear ratio.

Controller may determine the temperature of catalytic converter 20 in any suitable manner. For example, the temperature Tcat of catalytic converter 20 may be inferred from engine operations. In another embodiment, temperature Tcat is provided by temperature sensor 72.

Continuing with FIG. 2, brake pedal 130 is shown communicating with the driver's foot 132. Brake pedal position (PP) is measured by pedal position sensor 134 and sent to controller 12. The brake pedal may be coupled to a electronically and/or hydraulically assisted brake system that actuates one or more of the vehicle's brakes coupled to the vehicles wheels. Further, the vehicle may have an anti-lock braking system that is coupled in the brake system.

In an alternative embodiment, where an electronically controlled throttle is not used, an air bypass valve (not shown) can be installed to allow a controlled amount of air to bypass throttle plate 62. In this alternative embodiment, the air bypass valve (not shown) receives a control signal (not shown) from controller 12.

Figure 3:
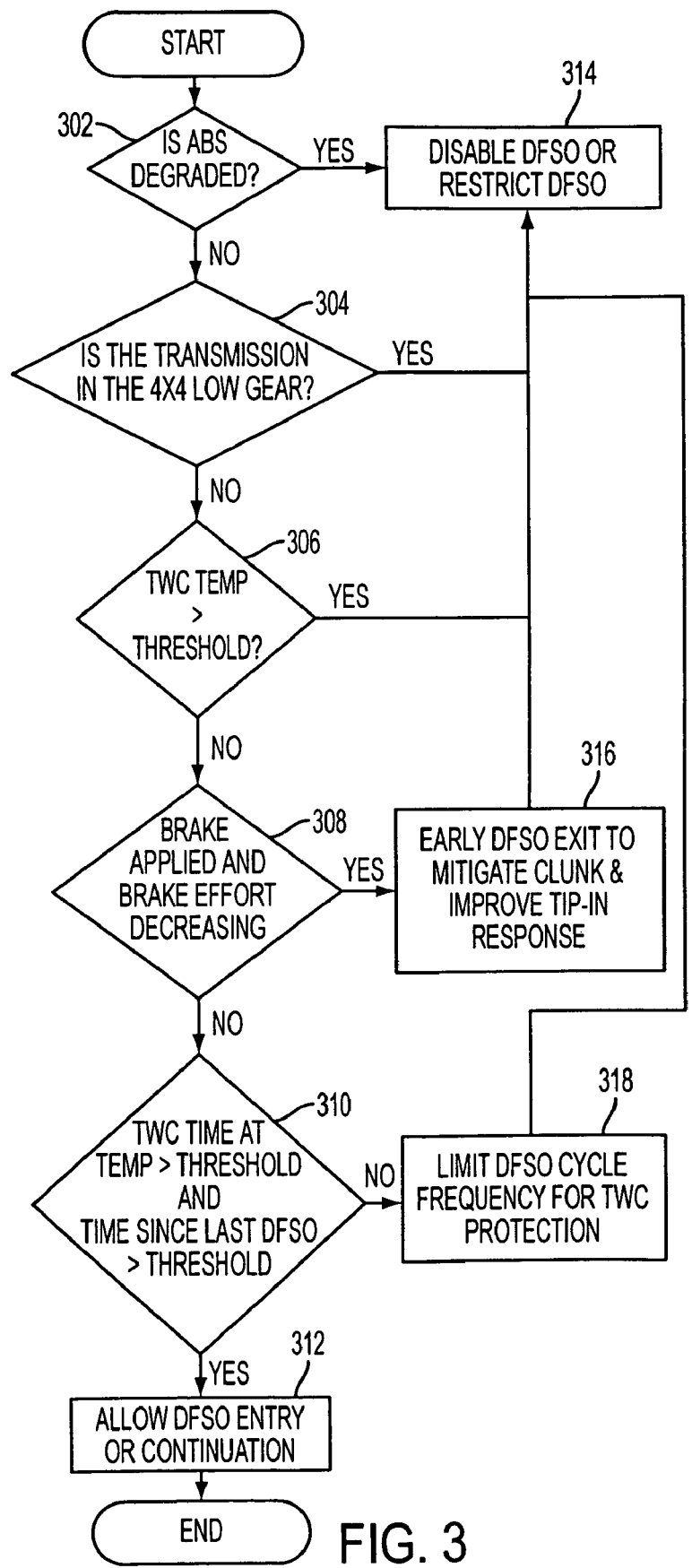
FIG. 3 is a high level flow diagram of a method to control reactivation and deactivation of fuel injection during DFSO.

FIG. 3 shows a high-level flow diagram depicting a control method or strategy for aggressive deceleration fuel shut off (DFSO) that may be used to improve fuel economy while also providing acceptable drive feel. Specifically, the approaches described herein may be used to address the issues associated with regulated emissions and drivability that may restrict the use of DFSO. For example, the strategy described in FIG. 3 may be used to overcome some disadvantages of DFSO and may allow for more aggressive use of DFSO during some deceleration operations.

Now referring to FIG. 3, the method determines the functioning of an anti-lock braking system (ABS) at 302. In some embodiments, the degradation of the ABS may be detected by brake pedal position, the wheel speed, or hydraulic pressure of braking system, others, or combinations thereof. If the ABS is degraded, then DFSO is disabled at 314. Alternatively, DFSO may be restricted to selected operating conditions, or restricted in operation. For example, DFSO may be performed in fewer cylinders or for fewer combustion cycles. In this way, it is possible to reduce the potential for engine stalls.

For example, an engine stall may occur if ABS is degraded while the vehicle's engine is performing DFSO on a low viscosity surface such as on ice or wet surfaces. By detecting the degradation of an ABS and disabling or restricting the deactivation of fuel injection to one or more cylinders, fuel injection may be reactivated in time to raise the speed of the engine to reduce a potential for stalling. In one embodiment, the reactivation of fuel injection includes at least partial open valve injection of fuel so that the torque output response can be provided as early as possible (rather than waiting for the next cylinder in which closed valve injection is possible). However, DSFO may be allowed if the ABS is functioning and the operating conditions of the engine meet the criteria set in the following steps of the method 300.

Next, the method 300 determines the gear conditions at 304. In some embodiments, the all wheel drive or 4×4, low gear (e.g., the lowest possible gear, or a gear substantially lower than regular operation, where such a low gear may be used for trailer towing, extreme environmental conditions, etc) may be detected based on a transmission state, engine and vehicle speed, or others. If the vehicle is in an all wheel drive or 4×4 low gear, the control method 300 disables DFSO or restricts DFSO at 314 as described herein. In this way, all wheel drive, or 4×4, low gear operation may be improved.

For example, during all wheel drive, or 4×4, low gear operation, torque disturbance may be magnified many times (e.g., up to or more than three times), and thus clunk may be more easily felt by a driver. By disabling DFSO during all wheel drive, or 4×4 low gear operation, the driver may be given a more controllable drivability and smooth transitions between torque changes.

Next, the method 300 determines the catalyst temperature of a three way conversion (TWC) operation and compares the temperature with a predetermined threshold at 306. In one embodiment, the temperature may be measured by temperature sensor 72. Alternatively, the temperature may be inferred from engine variables such as an amount of fuel injected, an injection pressure, an air charge mass used for combustion, etc. If the temperature is greater than the threshold, the routine disables DFSO or restricts DFSO at 314 as described herein. On the other hand, if the catalyst temperature is determined at 306 to be less than the threshold, the routine continues to determine another operating condition.

There is both a low temperature threshold corresponding to catalyst light off and a high temperature threshold corresponding to catalyst degradation. The low temperature threshold may be inferred when engine and transmission temperature are used as threshold which may be slower to warm up than the catalyst. When the temperature is high, upon entering into DFSO, the catalyst may experience an increase in temperature (as mush as 100° F.) but thereafter cools at a rate greater than it would when firing. Thus, DSFO may not be desired at high temperature because it may elevate the temperature to the point it would cause catalyst degradation. The act of 306 does not allow DFSO when catalyst temperature is high.

Next, the routine determines whether the driver is applying the brakes, and whether the driver's brake effort is decreasing at 308. Application of the brakes may be determined by a brake pedal position, hydraulic brake pressure, driver braking force, others, or combinations thereof. Further, a driver's brake effort, and whether such effort is decreasing, increasing, or substantially constant, may also be determined from such parameters. One example of a driver brake effort is an amount of force with which the driver actuates the brake pedal.

If the answer to 308 is Yes, an early DFSO exit is performed at 316 to mitigate clunk and improve tip-in response. An example of this procedure will be described in further detail in FIG. 4.

Next, if the answer to 308 is No, the routine determines the DFSO time between events at 310. If the time since last DSFO is greater than a threshold and the duration at which a three-way catalyst is operating at a temperature above an upper threshold is greater than a limit threshold, the routine proceeds to step 312 where new DFSO entry is allowed or DFSO is continued. Otherwise, the routine limits the cycle frequency of DFSO for TWC protection at 318 and then disable DFSO at 314.

Specifically, continuous cycling of DFSO can elevate actual catalyst temperature relative to an estimate catalyst temperature, in some examples, due to the repeated oxidation of stored oxygen and due to potential errors in estimation, such as due to errors in catalyst time constants. Additionally, continuous cycling of DFSO can cause drivability issues if the operator can feel the deceleration of DFSO operation. Limiting the continuous cycling of DFSO based on the thermal time constant of the catalyst system can thus limit the catalyst temperature relative to the catalyst model and can improve vehicle drivability.

Figure 4:
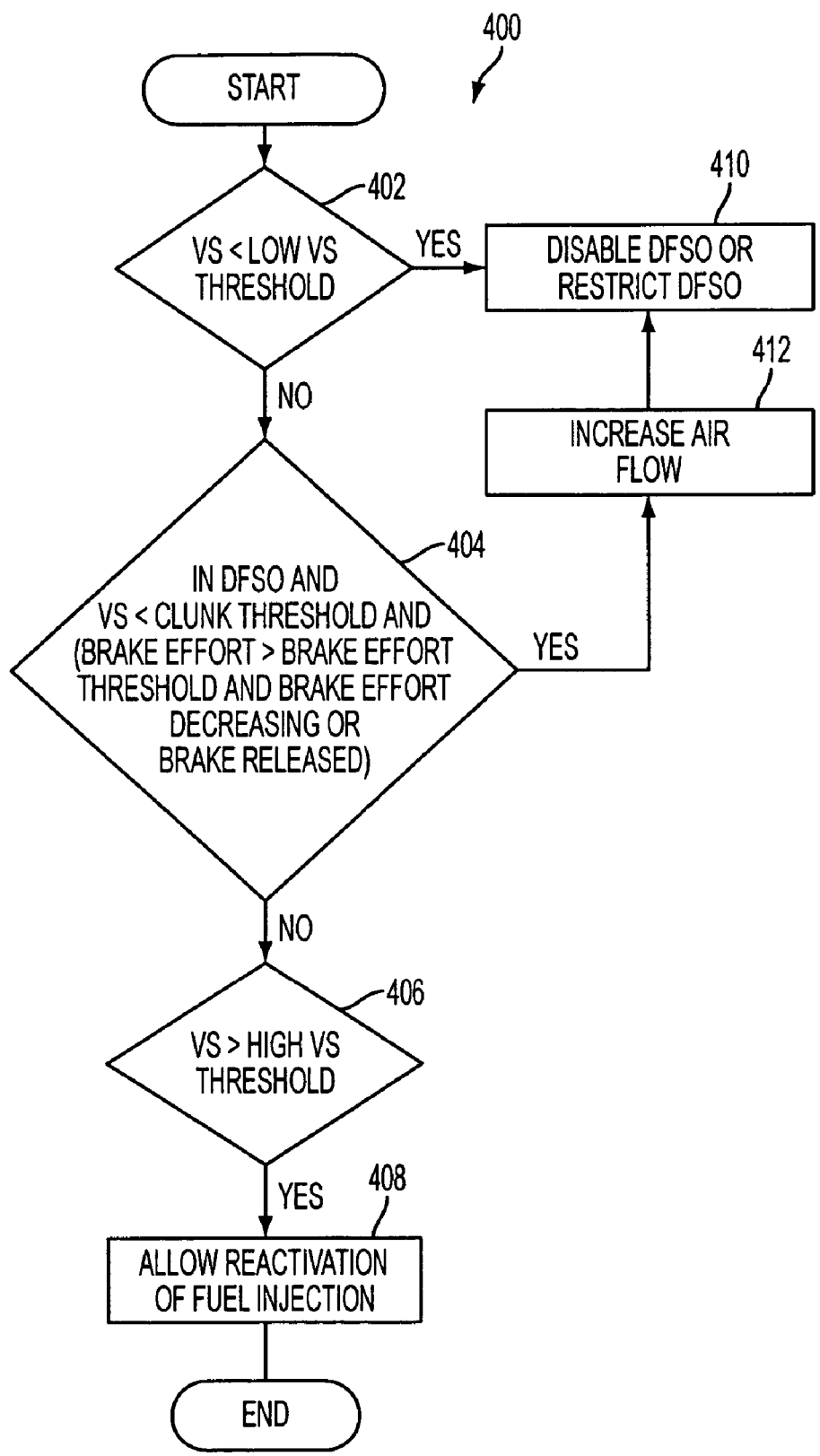
FIG. 4 is a flow diagram of an embodiment of a control method to reactivate fuel injector during DFSO to avoid clunk.

FIG. 4 depicts, generally at 400, an embodiment of an exemplary control method or routine to improve the drivability of a vehicle having an engine with DFSO operation. First, the routine 400 determines the vehicle speed and compares it with a low vehicle speed threshold value at 402. If the vehicle speed is less than the threshold, the routine disables DFSO or restricts DFSO at 410. In some embodiments, the threshold may be the speed at which a driver easily feels clunk.

Next, the routine determines at 404 a driver's brake effort, vehicle speed, and whether the vehicle is currently operating with one or more cylinders in DFSO. If so, the routine determines whether the vehicle speed (VS) is less than a threshold at which clunk may be perceptible or more perceptible, and determines whether the driver braking effort is greater than a threshold and the braking effort is decreasing or determines whether the brake is released. In some embodiments, the brake effort may be determined by the brake pedal position, hydraulic pressure in the brake, an anti-lock brake system sensor, or combinations thereof as noted herein. If the answer to 404 is yes, the routine prepares for disabling of DFSO. In one embodiment, as depicted at 412, air flow to the cylinder (s) may be increased before the reactivation of fuel injection to reduce engine misfires due to lack of sufficient air in the cylinder and the lower bound of the cylinder air charge misfire line. In another embodiment, air flow may be increased during the reactivation of fuel injection. In still another embodiment, the airflow may be increased before fuel injection reactivation for some cylinders, and during fuel injection reactivation of other cylinders. Then, at 410, DFSO is disabled (i.e., the fuel injector is reactivated). In another embodiment, the routine may include at least partial open valve fuel injection during reactivation of one or more cylinders, such as the first cylinder to be reactivated. The open valve injection may shorten the time for achieving a first combustion after reactivation by reducing the time to wait for fueling the first cylinder to be reactivated, fore example. Thus, the torque response may be improved.

From 404, the routine continues to 406 to compare the vehicle speed with a high vehicle speed threshold. If the vehicle speed is greater than the threshold, then the reactivation of fuel injection is allowed at 408. The routine can be repeated during the DFSO operation.

Controlling reactivation and deactivation of fuel injection based on the routine 400 has several advantages. For example, an early DFSO exit may mitigate clunk and improve tip-in response. Specifically, since it takes a certain duration (e.g., amount of time, or number of engine cycles) to re-enable engine firing, a driver may easily feel clunk on exit of DFSO if the injectors, combustion, transmission control and engine torque control do not have adequate time to stabilize. Thus, the routine 400 anticipates a driver's tip-in so as to prepare torque control prior to the tip-in event by making use of the brake input and effort. In this way, the engine is given sufficient time to prepare the reactivation of fuel injection. Thus, the engine may provide required torque once the driver tip-in. Further, since a driver may feel clunk more easily at lower vehicle speeds, the routine 400 also takes advantage of vehicle speed thresholds for the reactivation and deactivation of fuel injection to improve drivability. Therefore, disabling of DFSO may be controlled to improve the drivability as well as fuel economy.

Figure 5:
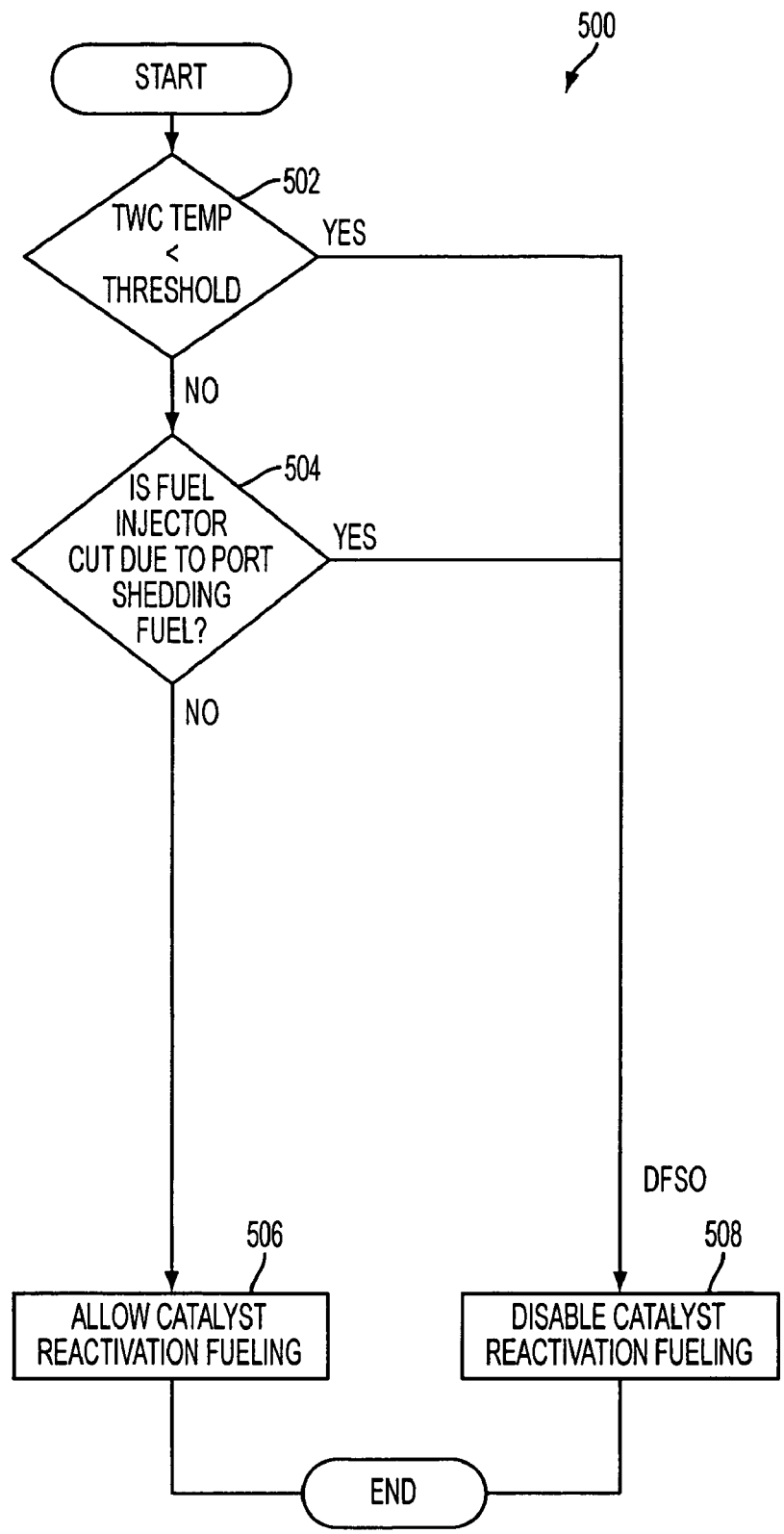
FIG. 5 is a flow diagram of an embodiment of a method to control catalyst reactivation during DFSO for the optimum operation of three way conversion catalyst.

FIG. 5 depicts one exemplary embodiment of a control routine at 500 for reactivation of three way conversion catalyst with DFSO operation. Catalyst reactivation may include fueling one or more cylinders of the engine rich (lacks oxygen for complete combustion) for a period of time or a number of combustion events based the oxygen stored in the catalyst to reduce stored oxygen in the catalyst. The routine 500 includes determining the temperature of the three way conversion catalyst and comparing the determined temperature with a predetermined threshold at 502. If the temperature is less than the threshold, the routine disables catalyst reactivation fueling at 508 since conversion of the rich gasses with stored oxygen may be degraded, and the amount of stored oxygen may be low. Thus, if the catalyst temperature is low and a DFSO or injector cut occurs, catalyst reactivation fueling may not be desired because the catalyst may not have stored oxygen to react with exhaust HC and CO, and any stored oxygen present may not successfully react with incoming HC and CO, thus resulting in HC and CO breakthrough.

Next, if the catalyst temperature is determined at 502 to be greater than the threshold, the routine goes to step 504 to determine if injector cut is due to port shedding fuel. If the injector cut is determined to be due to port shedding fuel at 504, the routine disables catalyst reactivation fueling at 508. If the injectors are cut on a tip out because port shedding of fuel is supplying the fuel, then the exhaust stream may be nominally stoichiometric and not lean. In this case, a catalyst reactivation may not be required because catalyst reactivation may cause excessively rich operation and emissions of HC and CO since sufficient fuel may be provided from port walls to the exhaust during fuel deactivation. Otherwise, if the injector cut is not due to port shedding fuel, the routine allows the catalyst reactivation fueling at 506.

Figure 6:
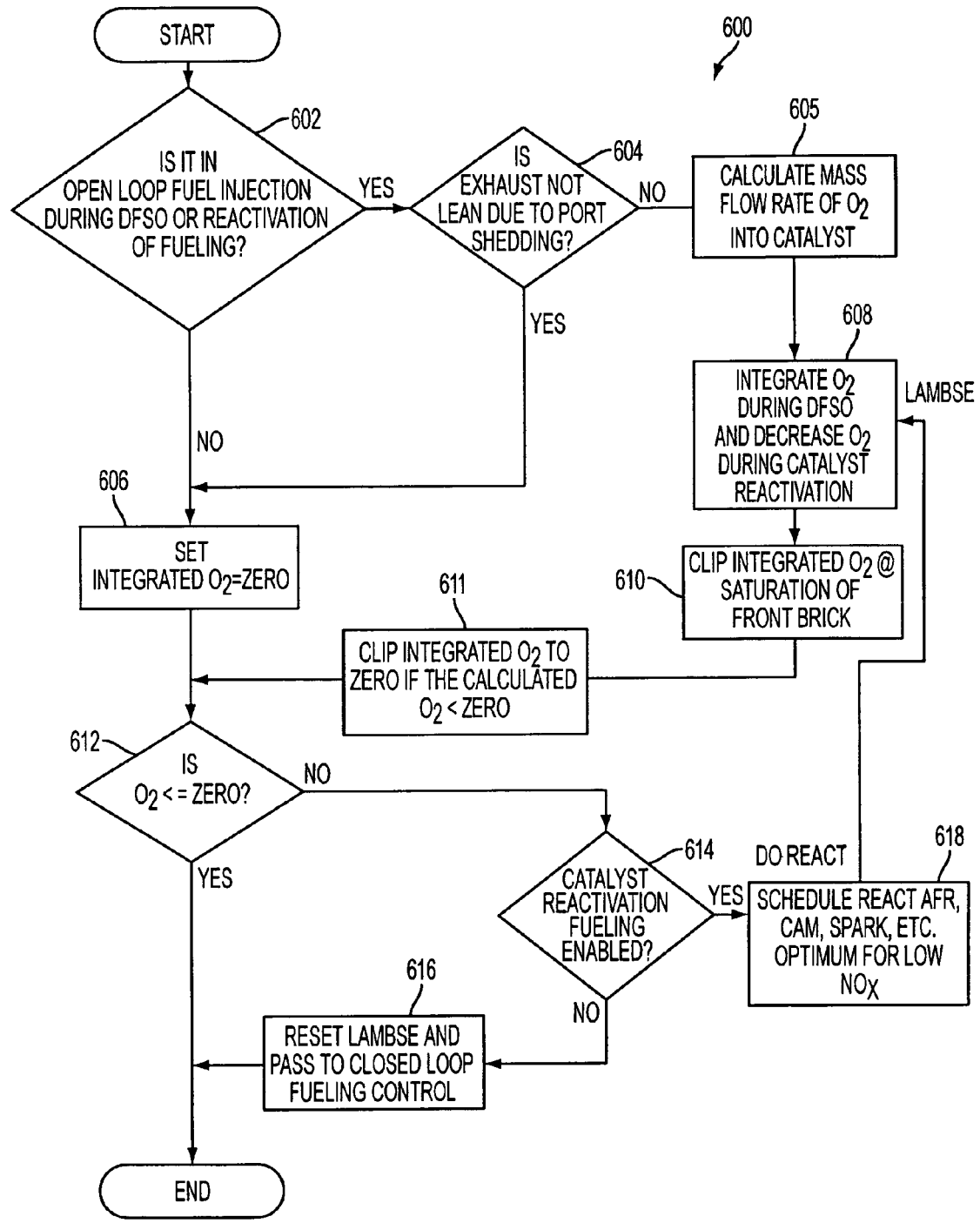
FIG. 6 is a flow diagram of an embodiment of a control method for three way conversion catalyst reactivation.

FIG. 6 shows a flow diagram depicting an exemplary control routine for TWC catalyst reactivation with DFSO operation. First, the routine determines at 602 whether an engine operation is in open loop fuel injection during DFSO or catalyst reactivation fueling. If the answer is no, the routine sets integrated stored oxygen in the emission control system equal to zero at 606. Otherwise, at 604, the routine further determines if the exhaust is not lean due to port shedding. If the answer is yes or the exhaust is rich, the routine sets integrated stored oxygen equal to zero at 606. If the answer to 604 is no or the exhaust is lean, the routine calculates a mass flow rate of oxygen into the catalyst at 605 based on parameters such as a mass airflow rate into the engine, a fuel injection amount, exhaust air-fuel ratio, and/or others. Next, the routine integrates stored oxygen during DFSO and decreases stored oxygen during catalyst reactivation. Next, at 610, the routine includes clipping integrated oxygen at saturation of a front brick, such as based on an area of the front brick. The maximum capacity of a catalyst may be decreased due to aging of the catalyst, and thus by utilizing a reduce capacity, increased robustness to variation may be achieved. The act of 610 may take into account the effect of aging as determined by controller 12. Next, at 611, the routine clips integrated oxygen to zero if the calculated mass flow rate of oxygen is less than zero.

From 606 and 611, the routine continues to 612 to compare the stored (integrated) oxygen with zero. If the oxygen is less than or equals to zero, the routine ends. If the oxygen is greater than zero, the routine further determines whether catalyst reactivation fueling is enabled at 614. If the reactivation fueling is enabled, the routine includes scheduling reactivation at 618, at which point one or more cylinders may be reactivated and operated with a rich exhaust air-fuel ratio for one or more cycles. In one embodiment, excess fuel is limited to the amount required to meet emissions at an aged catalyst condition, for example. In some embodiments, operating conditions such as air-fuel ratio, cam timing, and/or spark may be adjusted during reactivation when a catalyst is not yet functioning to reduce NOx emissions in the first few engine cycles, which may be a different settings compared with when starting the cylinders from rest.

If reactivation fueling is determined at 616 not to be enabled, the routine reset desired air-fuel ratio or LAMBSE and passes the value to closed loop fuel injection control at 616. The procedure can be repeated during the DFSO and catalyst reactivation fueling events.

The routine 600 may overcome various disadvantages associated with DFSO operation. For example, when a cylinder of the engine is operated with the injector off, the catalyst can absorbs the free oxygen in the exhaust stream and become saturated to its capacity with oxygen. The catalyst can saturates quickly in cases where the catalyst has a relatively low oxygen capacity due to the high oxygen flow rates out of the engine, such as when multiple cylinders are operated in DFSO. In the completely oxygenated condition, the catalyst may only oxidize $H_2$, HC and CO. As a result, the feed gas NOx may pass through as tail pipe emissions with little or no conversion. Therefore, the oxygen stored in the catalyst may be locally removed before it is capable of converting NOx to its constituents. The routine 600 approaches this situation by catalyst reactivation, i.e., fueling one or more cylinders of the engine rich (lacks oxygen for complete combustion) for a period of time or a number of combustion events based the oxygen stored in the catalyst. Such operation creates an exhaust stream that is rich in $H_2$, HC and CO which can react with the $O_2$ stored on the catalyst and thereby reduce the $O_2$ stored on the catalyst.

Please note the use of more aggressive DFSO can be extended under operating conditions where the risk of stall is increased due to rapid deceleration and eminent lock-up of the driven wheels. In one embodiment, under these conditions, rather than, or in addition to, brake effort, the second derivative of speed, namely the jerk, of the transmission output shaft speed (oss) or the nearest detected speed of the wheels may be used. Thus, various powertrain shaft speeds may be used.

Under conditions where there may not be risk of stall, the negative acceleration of the wheels and thus the oss may be gradual and detectable. However, under conditions where there exists an abrupt change in acceleration, the rate of change of acceleration, also the jerk, may abruptly change in the direction corresponding to the direction of acceleration. When the jerk drops below a threshold (e.g., the rate of change of deceleration is greater than a threshold), it is likely that the wheels may lock up in the case of degrade ABS functionality. To avoid the possibility of stall independent of noting the vehicle acceleration or the rate of brake effort or the like, the injectors should be turned back on when the jerk dips below a threshold. In one embodiment, the fuel injector may be reactivated when a rate of change of output shaft speed is below a threshold. In another embodiment, the fuel injector may be reactivated when a rate of change of output shaft acceleration is below a threshold. In yet another embodiment, the fuel injectors may be turned on when a predicted output shaft speed is below a threshold. The predicted output shaft speed may be based on measured speed, measured acceleration, and predicted time during the acceleration. The predicted output shaft speed equals to measured speed plus measured acceleration multiplied by predicted time. Additionally, the jerk itself may be used as feedback to adjust torque control efforts during torque reactivation to reduce drivability issues related to abrupt changes in acceleration. Additionally, the jerk threshold may be set as a function of the current gear, or ratio of speeds (i.e. n to oss), so as to allow for even more aggressive use of DFSO. Furthermore, the jerk threshold may be adjusted as a function of the ABS functionality, if it is known. However, one advantage of the jerk is that it can be used independent of the state of the ABS system.

Note that the control routines included herein can be used with various engine configurations, such as those described above. The specific routine described herein may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated steps or functions may be repeatedly performed depending on the particular strategy being used. Further, the described steps may graphically represent code to be programmed into the computer readable storage medium in controller 12.

It will be appreciated that the processes disclosed herein are exemplary in nature, and that these specific embodiments are not to be considered in a limiting sense, because numerous variations are possible. The subject matter of the present disclosure includes all novel and non-obvious combinations and subcombinations of the various camshaft and/or valve timings, fuel injection timings, and other features, functions, and/or properties disclosed herein.

Furthermore, the concepts disclosed herein may be applied to dual fuel engines capable of burning various types of gaseous fuels and liquid fuels.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the injection and temperature methods, processes, apparatuses, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

What is claimed is:

1. A method of controlling fuel injection in an engine of a vehicle with wheels, the vehicle having an anti-lock braking system, at least one cylinder, and at least one fuel injector, the method comprising:
   in response to deceleration vehicle conditions in which the wheels can lock-up, the deceleration vehicle conditions including conditions of degraded operation of the anti-lock braking system, restricting deactivation of the fuel injection during the deceleration vehicle operating conditions.

2. The method of claim 1, wherein the degraded operation is detected based on one of a brake pedal position, wheel speed, and hydraulic pressure of the braking system.

3. The method of claim 1, wherein the degraded operation is detected by an anti-lock braking system sensor.

4. The method of claim 1, wherein the restricting deactivation of the fuel injection includes disabling deactivation of the fuel injection for at least one cylinder.

5. The method of claim 1, wherein the restricting deactivation of the fuel injection includes disabling deactivation of all the cylinders.

6. The method of claim 1, wherein the method further comprises reactivation of at least one fuel injector.

7. The method of claim 6, wherein the reactivation includes at least partial open cylinder valve fuel injection.

8. The method of claim 6, wherein the reactivation includes increasing air flow to the cylinder before the reactivation of the fuel injectors.

9. A method of controlling fuel injection in an engine of a vehicle, the vehicle having an anti-lock braking system and at least one cylinder, the method comprising:
   under a first set of deceleration vehicle conditions where the anti-lock braking system is functioning, disabling fuel injection during the first set of deceleration vehicle operating conditions; and
   under a second set of deceleration vehicle conditions in which the wheels can lock-up, the deceleration vehicle conditions including the anti-lock braking system being determined to be degraded and the vehicle on a low viscosity surface, restricting deactivation of the fuel injection during the second set of deceleration vehicle operating conditions.

10. The method of claim 9, wherein the degraded operation is detected based on one of a brake pedal position, wheel speed, and hydraulic pressure of the braking system, said restriction during the second set of conditions reducing engine stalling.

11. The method of claim 9, wherein the degraded operation is detected by an anti-lock braking system sensor.

12. The method of claim 9, wherein the restricting deactivation of the fuel injection includes disabling deactivation of the fuel injection for at least one cylinder.

13. The method of claim 9, wherein the restricting deactivation of the fuel injection includes disabling deactivation of all the cylinders.

14. The method of claim 9, wherein the method further comprises reactivation of at least one fuel injector.

15. The method of claim 14, wherein the reactivation includes at least partial open cylinder valve fuel injection.

16. The method of claim 14, wherein the reactivation includes increasing air flow to the cylinder before the reactivation of the fuel injectors.

17. The method of claim 14, wherein the reactivation includes fueling the engine rich to reduce oxygen stored on a catalyst during deceleration fuel shut off.

\* \* \* \* \*